United States Patent
Ojha et al.

(10) Patent No.: US 12,475,081 B2
(45) Date of Patent: Nov. 18, 2025

(54) ADAPTIVE ARCHIVE OF DATA CHUNKFILES

(71) Applicant: Cohesity, Inc., San Jose, CA (US)

(72) Inventors: Deepak Ojha, Fremont, CA (US); Zhihuan Qiu, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 18/358,585

(22) Filed: Jul. 25, 2023

(65) Prior Publication Data

US 2025/0036593 A1    Jan. 30, 2025

(51) Int. Cl.
*G06F 16/11* (2019.01)
*G06F 11/34* (2006.01)
*G06F 16/174* (2019.01)

(52) U.S. Cl.
CPC ........ *G06F 16/113* (2019.01); *G06F 11/3419* (2013.01); *G06F 16/1752* (2019.01)

(58) Field of Classification Search
CPC . G06F 16/113; G06F 11/3419; G06F 16/1752
USPC ........................................................ 707/661
See application file for complete search history.

(56) References Cited

U.S. PATENT DOCUMENTS

| | | | | |
|---|---|---|---|---|
| 2003/0126247 A1* | 7/2003 | Strasser | .............. | G06F 11/1458 707/999.2 |
| 2005/0193069 A1* | 9/2005 | Brown | ................. | G06Q 10/107 709/224 |
| 2012/0221527 A1* | 8/2012 | Huang | ................ | G06F 11/1448 707/654 |
| 2014/0050458 A1* | 2/2014 | Mochinaga | ............... | H04N 5/85 386/239 |
| 2015/0036237 A1* | 2/2015 | Abe | ......................... | G11B 5/09 360/73.04 |
| 2015/0095485 A1* | 4/2015 | Alatorre | ................ | H04L 47/125 709/224 |
| 2015/0205536 A1* | 7/2015 | Ohta | ................... | G11B 5/00813 711/112 |
| 2016/0124663 A1* | 5/2016 | Mitkar | ................ | G06F 16/1748 711/162 |

(Continued)

OTHER PUBLICATIONS

Cohesity, "Cohesity SpanFS and SnapTree", Cohesity, Inc., Sep. 2019, 11 pp., Retrieved from the Internet on Sep. 29, 2023 from URL: https://www.cohesity.com/resource-assets/white-paper/Cohesity-SpanFS-and-SnapTree-WP.pdf.

(Continued)

*Primary Examiner* — Cam Y T Truong
(74) *Attorney, Agent, or Firm* — Shumaker & Sieffert, P.A.

(57) ABSTRACT

Techniques are described for performing direct archive of data chunkfiles. A computing system comprising a storage device and processing circuitry having access to the storage device may be configured to perform various aspects of the techniques. The processing circuitry may be configured to predict an incoming data rate of native format to be archived to obtain a predicted incoming data rate for the native format data to be archived, and compare the predicted incoming data rate to a first threshold data rate. The processing circuitry may also be configured to, responsive to determining that the predicted incoming data rate exceeds a first threshold data rate, segment the native format data into chunks, and directly write the chunks to an archive storage system as a chunkfile.

15 Claims, 7 Drawing Sheets

(56) References Cited

U.S. PATENT DOCUMENTS

| | | | |
|---|---|---|---|
| 2018/0341555 A1* | 11/2018 | Tsao | G06F 11/1466 |
| 2019/0065322 A1 | 2/2019 | Chakankar et al. | |
| 2021/0248106 A1* | 8/2021 | Sergeev | G06F 11/1448 |
| 2021/0255935 A1* | 8/2021 | Dornemann | G06F 3/0619 |
| 2022/0029794 A1* | 1/2022 | Malhotra | H04L 9/3242 |
| 2022/0060926 A1* | 2/2022 | Kappla | H04L 45/123 |
| 2022/0358540 A1* | 11/2022 | Hill | G06N 20/00 |
| 2023/0077938 A1 | 3/2023 | Yarlagadda et al. | |
| 2024/0080510 A1* | 3/2024 | Grigsby | H04L 65/611 |

OTHER PUBLICATIONS

Gontarska et al., "Evaluation of Load Prediction Techniques for Distributed Stream Processing", 2021 IEEE International Conference on Cloud Engineering, IEEE, Oct. 4, 2021, pp. 91-98, URL: https://arxiv.org/pdf/2108.04749.pdf.

Tableau, "Time Series Forecasting: Definition, Applications, and Examples", Tableau Software, LLC, 7 pp., Retrieved from the Internet on Mar. 10, 2023 from URL: https://www.tableau.com/learn/articles/time-series-forecasting.

Cho et al., "DCF: An Efficient Data Stream Clustering Framework for Streaming Applications", Database and Expert Systems Applications: 17th International Conference, DEXA 2006, Springer Berlin Heidelberg, 2006, 9 pp., (Applicant points out, in accordance with MPEP 609.04(a), that the year of publication, 2006, is sufficiently earlier than the effective U.S. filing date, so that the particular month of publication is not an issue.).

Extended Search Report from counterpart European Application No. 24190104.0 dated Dec. 9, 2024, 11 pp.

Response to Extended Search Report dated Dec. 9, 2024, from counterpart European Application No. 24190104.0 filed Jul. 25, 2025, 19 pp.

* cited by examiner

ADAPTIVE ARCHIVE OF DATA CHUNKFILES

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure describe techniques for adaptive archive of data chunkfiles. Chunkfiles may each represent an object in an archive storage system that conforms to an underlying architecture of the archive storage system. A data platform that supports archiving may interface with the archive storage system to store the chunkfiles after forming the chunkfiles from one or more chunks of native format data. The data platform may apply a process referred to as "deduplication" with respect to the chunks to remove redundant chunks and specify metadata linking the redundant chunks to previously archived chunks, thereby reducing storage consumed (while also reducing storage costs in terms of storage required to store the chunks). The data platform may aggregate chunks with metadata to form the chunkfile at the archive storage system.

In certain contexts, such as streaming, the data platform may receive streams of native format data for which a fixed size (or, in other words, a fixed amount) of the native format data is not known in advance of archiving the chunks. The uncertainty in terms of the size of the native format data is contrasted with receiving all of the native format data upfront via a write request, in which case the data platform may know the extent of the resulting chunks and thereby potentially optimize the size of chunkfiles stored to the archive storage system. The uncertainty with regard to streaming of native format data in terms of the size of the native format data to be archived may result in the data platform operating inefficiently with respect to the archiving of chunks.

The data platform may operate inefficiently because, as one example, the data platform may be unable to optimize the size of chunkfiles and instead resort to initially storing the chunks to a storage system local to the data platform (which may also be referred to as a "local storage system"), which consumes additional memory, memory bandwidth, local storage and bandwidth, processing cycles, and/or other computing resources and also results in delay in archiving chunks but provides for more efficiently sized chunkfiles stored at the archived storage system. As another example, the data platform may avoid consumption of computing resources to store the chunks to the local storage system and reduce delay in archiving the chunks as, but possibly at the expense of inefficiently-sized chunkfiles (which are objects that include a batch of chunks) stored to the archive storage system that result in increased consumption of storage resources at the archive storage system, along with an accompanying increase in operational costs compared to more efficiently-sized chunkfiles.

Rather than either statically determining to store the chunks to the local storage system or proceeding with direct archiving of chunks to the archive storage system, the data platform may instead predict an incoming data rate to obtain a predicted incoming data rate. The data platform may predict incoming data rates for a given source (originating the native format data), a given stream of native format data, across streams from the same source originating the native format data, etc. Using this predicted incoming data rate, the data platform may apply one or more threshold data rates to adaptively and dynamically select between storing the chunks to the local storage system or storing (in other words, archiving) the chunks directly to the archive storage system for purposes of processing the chunks. (In the former case, the data platform may temporarily store chunks in a local repository (e.g., random access memory—RAM, and/or Flash memory) separate from the local storage system used to store at least a portion of a local copy of the filesystem.

The techniques may provide one or more technical advantages that realize a practical application. For example, the techniques may reduce computing resource consumption at the local storage system and the archive storage system by adaptively determining, for a given duration of time, where streams of native format data should be stored prior to archiving the resulting batches of chunks as one or more chunkfiles at the archive storage system. The data platform may implement the techniques to more efficiently archive chunks when the predicted incoming data rate indicates that native format data is to be received in amounts exceeding a threshold rate (in a given duration), thereby more quickly archiving the chunks to potentially achieve optimally sized (or in other words properly sized) cloud chunkfiles (or chunkfiles on archive storage system). The data platform may, when the predicted incoming data rate indicates that native format data is to be received in amounts below the threshold rate (in the given duration), store the chunks to the local storage system. As a result, the data platform may reduce consumption of memory, memory bandwidth, and/or other computing resources at the local storage system, reduce disk writes and reads at the local storage system, reduce metadata and garbage collection loads, and reduce delay in archiving chunks, while also potentially storing optimal sized chunkfiles that reduce consumption of computing resources at the archive storage system (and associated monetary costs) by, e.g., reducing metadata bloat due to a larger number of smaller-sized chunkfiles.

Although the techniques described in this disclosure are primarily described with respect to an archive function of a data platform, similar techniques may be applied for a backup function or other similar function of the data platform (potentially involving deduplication).

In one example, this disclosure describes a method comprising: predicting, by a data platform implemented by a computing system, an incoming data rate of native format data to be archived; comparing the predicted incoming data rate to a first threshold data rate; and responsive to determining that the predicted incoming data rate exceeds the first threshold data rate: segmenting, by the data platform, the native format data into chunks; and directly writing the chunks to an archive storage system as a chunkfile.

In another example, this disclosure describes a computing system comprising: a storage device; and processing circuitry having access to the storage device and configured to: predict an incoming data rate of native format to be archived to obtain a predicted incoming data rate for the native format data to be archived; compare the predicted incoming data rate to a first threshold data rate; and responsive to determining that the predicted incoming data rate exceeds a first threshold data rate: segment the native format data into chunks; and directly write the chunks to an archive storage system as a chunkfile.

In another example, this disclosure describes a computer-readable storage medium comprising instructions that, when executed, configure processing circuitry of a computing system to: predict an incoming data rate of native format to be archived to obtain a predicted incoming data rate for the native format data to be archived; compare the predicted incoming data rate to a first threshold data rate; and responsive to determining that the predicted incoming data rate exceeds a first threshold data rate: segment the native format data into chunks; and directly write the chunks to an archive storage system as a chunkfile.

BRIEF DESCRIPTION OF THE DRAWINGS

Like reference characters denote like elements throughout the text and figures.

DETAILED DESCRIPTION

Figure 1A:
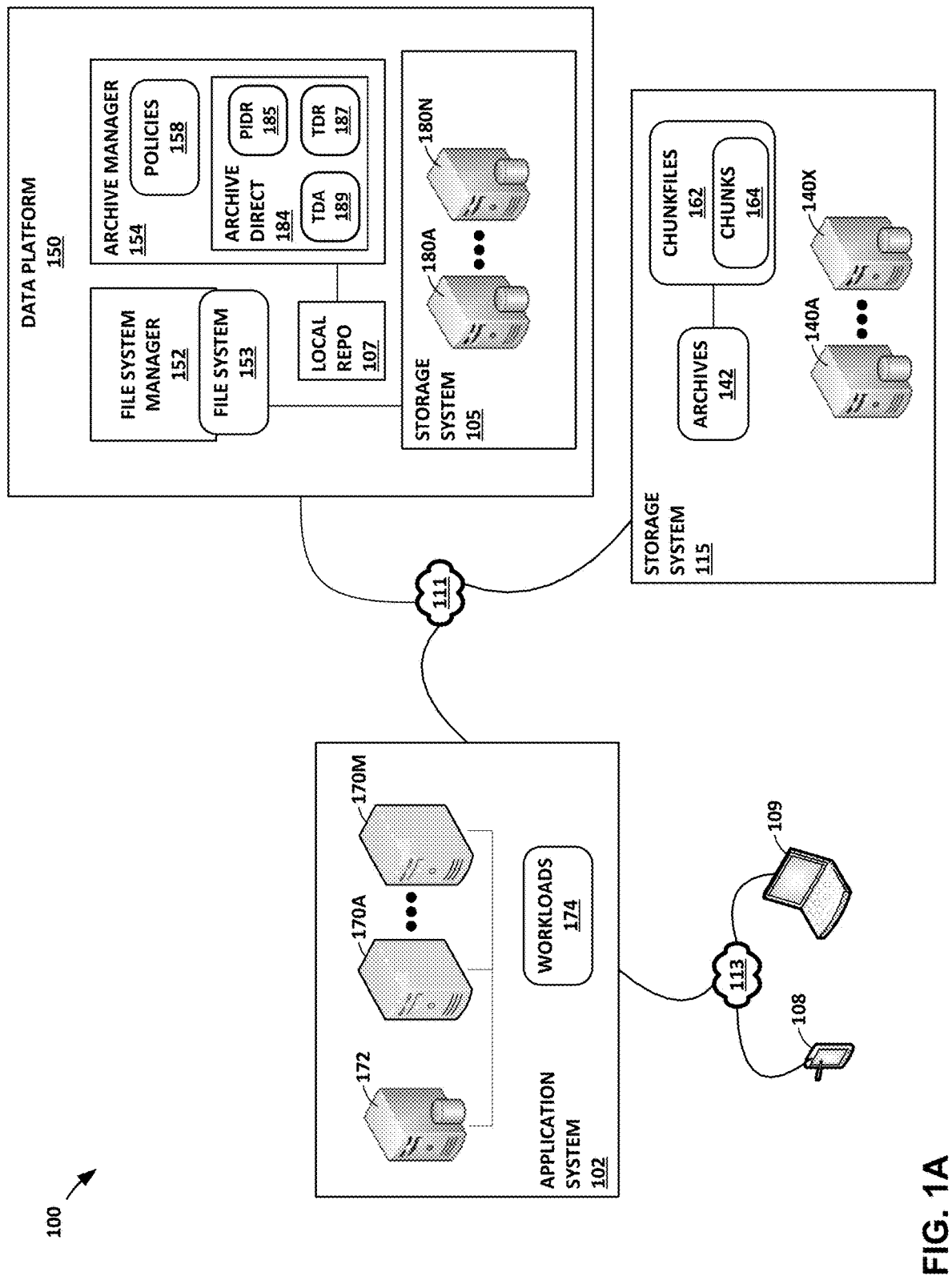
FIGS. 1A-1B are block diagrams illustrating example systems that perform adaptive direct archiving of data chunks, in accordance with one or more aspects of the present disclosure.
Figure 1B:
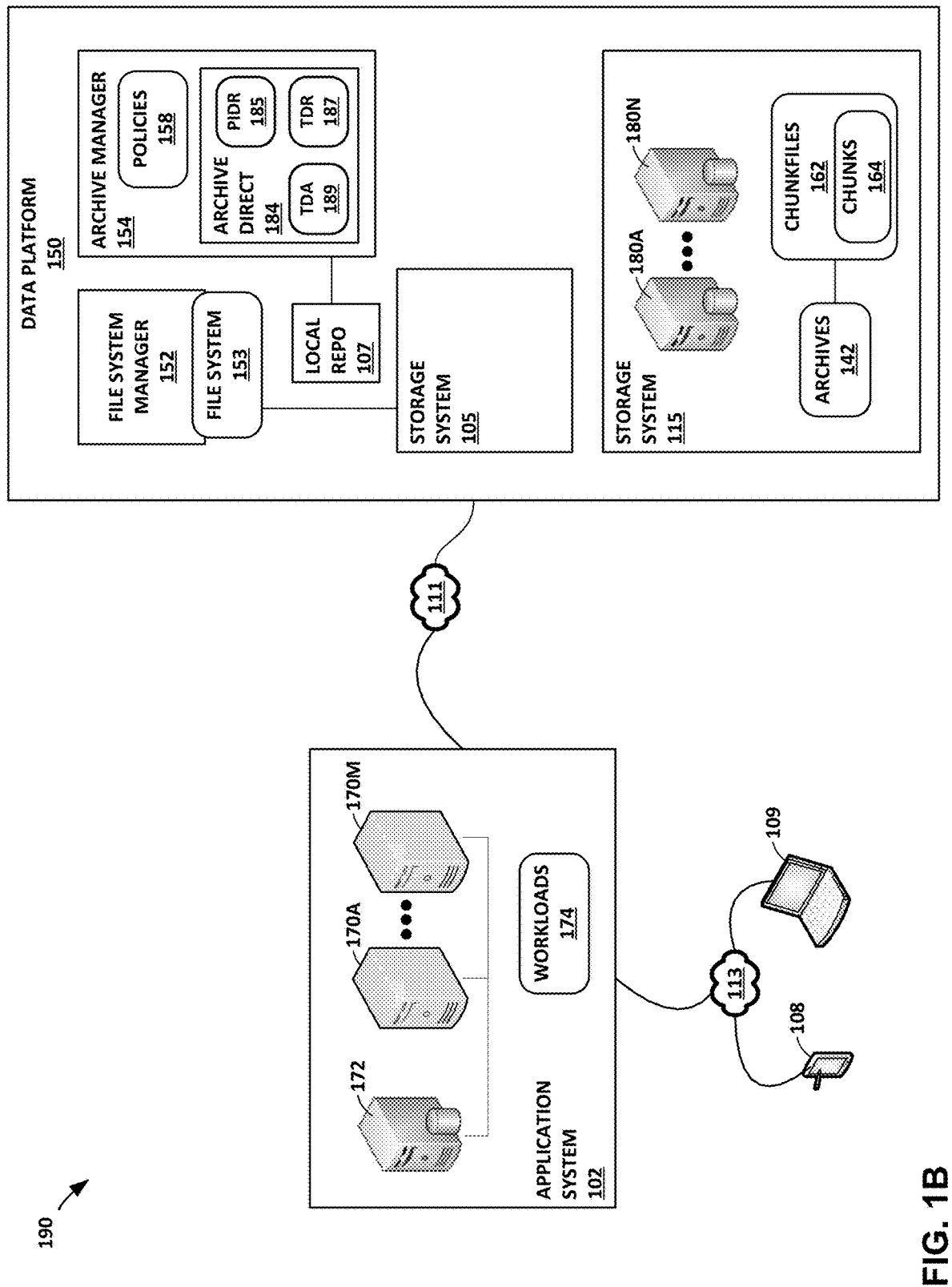

FIGS. 1A-1B are block diagrams illustrating example systems that perform adaptive direct archiving of data chunks, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and archive manager 154 in the example of system 100, and store objects and metadata for data platform 150 to storage media. In some examples, separate compute devices (not shown) execute software for data platform 150, such as file system manager 152 and archive manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Archives 142 or snapshots created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes archive manager 154 that provides archiving of file system data for file system 153. In the example of system 100, archive manager 154 archives file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for archives 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup and archive. In general, a file system backup is a copy of file system 153 to support protecting file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Archive manager 154 may archive file system data for file system 153 at any time in accordance with archive policies that specify, for example, archive periodicity and timing (daily, weekly, etc.), which file system data is to be archived, an archive retention period, storage location, access control, and so forth. An initial archive of file system data corresponds to a state of the file system data at an initial archive time (the archive creation time of the initial archive). The initial archive may include a full archive of the file system data or may include less than a full archive of the file system data, in accordance with archive policies. For example, the initial archive may include all objects of file system 153 or one or more selected objects of file system 153.

One or more subsequent incremental archives of the file system 153 may correspond to respective states of the file system 153 at respective subsequent archive creation times, i.e., after the archive creation time corresponding to the initial archive. A subsequent archive may include an incremental archive of file system 153. A subsequent archive may correspond to an incremental archive of one or more objects of file system 153. Some of the file system data for file system 153 stored on storage system 105 at the initial archive creation time may also be stored on storage system 105 at the subsequent archive creation times. A subsequent incremental archive may include data that was not previously archived to storage system 115. File system data that is included in a subsequent archive may be deduplicated by archive manager 154 against file system data that is included in one or more previous archives, including the initial archive, to reduce the amount of storage used. (Reference to a "time" in this disclosure may refer to dates and/or times. Times may be associated with dates. Multiple archives may occur at different times on the same date, for instance.)

In system 100, archive manager 154 archives file system data to storage system 115 as archives 142, using chunkfiles 162. Archive manager 154 may use any of archives 142 to subsequently restore the file system (or portion thereof) to its state at the archive creation time, or the archive may be used to create or present a new file system (or "view") based on the archive, for instance. As noted above, archive manager 154 may deduplicate file system data included in a subsequent archive against file system data that is included in one or more previous archives. For example, a second object of file system 153 and included in a second archive may be deduplicated against a first object of file system 153 and included in a first, earlier archive. Archive manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Archive manager 154 may apply deduplication as part of a write process of writing (i.e., storing) an object of file system 153 to one of archives 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, archive manager 154 can compute chunks having chunk sizes within the range of 16-48 kB. Archive manager 154 may eschew deduplication for objects that that are less than 16 kB. In some example implementations, when data of an object is being considered for deduplication, archive manager 154 compares a chunk identifier (ID) (e.g., a hash value of the entire chunk) of the data to existing chunk IDs for already stored chunks. If a match is found, archive manager 154 updates metadata for the object to point to the matching, already stored chunk. If no matching chunk is found, archive manager 154 writes the data of the object to storage as one of chunks 164 for one of chunkfiles 162. Archive manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of archives 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time. A WORM lock for an S3 object is known as an "object lock" and a WORM lock for an object within AZURE Blob Storage is known as "blob immutability."

The process of deduplication for multiple objects over multiple archives results in chunkfiles 162 that each have multiple chunks 164 for multiple different objects associated with the multiple archives. In some examples, different archives 142 may have objects that are effectively copies of the same data, e.g., for an object of the file system that has not been modified. An object of an archive may be represented or "stored" as metadata having references to chunks that enable the archived object to be accessed. Accordingly, description herein to an archive "storing," "having," or "including" an object includes instances in which the archive does not store the data for the object in its native form.

The initial archive and the one or more subsequent incremental archives of archives 142 may each be associated with a corresponding retention period and, in some cases, a data lock period for the archive. As described above, a data management policy (not shown) may specify a retention period for an archive and a data lock period for an archive. A retention period for an archive is the amount of time for which the archive and the chunks that objects of the archive reference are to be stored before the archive and the chunks are eligible to be removed from storage. The retention period for the archive begins when the archive is stored (the archive creation time). A chunkfile containing chunks that objects of an archive reference and that are subject to a retention period of the archive, but not subject to a data lock period for the archive, may be modified at any time prior to expiration of the retention period. The nature of such a modification must be such to preserve the data referenced by objects of the archive.

A user or application associated with application system 102 may have access (e.g., read or write) to archived data that is stored in storage system 115. The user or application may delete some of the data due to a malicious attack (e.g., virus, ransomware, etc.), a rogue or malicious administrator, and/or human error. The user's credentials may be compromised and as a result, the archived data that is stored in storage system 115 may be subject to ransomware. To reduce the likelihood of accidental or malicious data deletion or corruption, a data lock having a data lock period may be applied to an archive.

As described above, chunkfiles 162 may represent an object in an archive storage system (shown as "storage system 115," which may also be referred to as "archive storage system 115") that conform to an underlying architecture of archive storage system 115. Data platform 150 includes archive manager 154 that supports archiving of data in the form of chunkfiles 162, which interface with archive storage system 115 to store chunkfiles 162 after forming chunkfiles 162 from one or more chunks 164 of data. Archive manager 154 may apply a process referred to as "deduplication" with respect to chunks 164 to remove redundant chunks and generate metadata linking redundant chunks to previously archived chunks 164 and thereby reduce storage consumed (and thereby reduce storage costs in terms of storage required to store the chunks). Archive manager 154 may aggregate chunks 164 with metadata to form chunkfile 162 at archive storage system 115.

In certain contexts, such as streaming, data platform 150 may receive, from application system 102, streams of native format data for which a fixed size (or, in other words, a fixed amount) of the native format data is not known in advance of archiving the native format data as chunks 164. The uncertainty in terms of the size of the native format data is contrasted with receiving all of the data upfront via a write request, in which case archive manager 154 may know the extent of resulting chunks 164 and thereby potentially optimize the size of chunkfiles 162 stored to archive storage system 115. The uncertainty with regard to streaming of native format data in terms of the size of the native format data to be archived may result in archive manager 154 operating inefficiently with respect to the archiving of chunks 164.

Archive manager 154 may operate inefficiently in such contexts because, as one example, archive manager 154 may be unable to optimize the size of chunkfiles 162 and instead resort to storing chunks 164 to storage system 105 local to data platform 115 (which may also be referred to as a "local storage system 105"), which consumes additional memory, memory bandwidth, processing cycles, and/or other computing resources and also results in delay in archiving chunks 164 but provides for more efficiently sized chunkfiles 162. As another example, archive manager 154 may avoid consumption of computing resources to store chunks 164 to local storage system 105 and reduce delay in archiving the chunks, but possibly at the expense of inefficiently sized chunkfiles 162 that result in increased consumption of storage resources at archive storage system 115, along with an accompanying increase in storage costs compared to more efficiently-sized chunkfiles 162.

These inefficiencies may result, e.g., in the context of streaming, when application system 102 does not permit a data platform agent to execute or otherwise operate within application system 102. Where application system 102 does operate with a data platform agent, data platform 150 may communicate with the data platform agent, which may segment native format data into chunks local to application system 102, where access to an approximate size of the native format data is more easily derived (considering that an approximate size of the underlying native format data, e.g., a file size for a file, is more easily accessible given that the data platform agent may have access to the primary file system for application system 102). The data platform agent may not however perform deduplication with respect to chunks given that the data platform agent may not be aware of other chunks stored to or by data platform 150 and/or archive storage system 115. Moreover, the data platform agent, even when not performing segmentation of the native format data into chunks, may issue write requests that define a size of the native format data to chunk and deduplicate, rather than open a stream with an undefined size of the native format data, where such size metadata may allow more efficient operation of the data platform in terms of chunking and deduplicating the native format data. The data platform agent may therefore have more access to the native format data (which may refer to data in a format native to, or in other words supported by, application system 102) and potentially optimize a size of chunks that results in more optimal chunkfiles 162.

In instances where application system 102 does not permit execution of the data platform agent, archive manager 154 may receive one or more streams of native format data without having much if any access to the primary file system for application system 102. This lack of access may result in the above noted inefficiencies and the resulting issues in terms of delay, computing resource consumption, power consumption, and associated monetary costs.

In accordance with techniques of this disclosure, archive manager 154 may include an archive direct module 184 (shown as and may be referred to as "archive direct 184") that may, rather than statically determining to either initially store and accumulate chunks 164 to a local repository 107 ("local repo 107") separate from local storage system 105 or proceed with direct archiving of chunks 164 to archive storage system 115, instead predict an incoming data rate to obtain a predicted incoming data rate (PIDR) 185. Archive direct 184 may predict incoming data rates for a given source (originating the native format data, such as application system 102), a given stream of native format data, across different streams from the same source and/or tenant originating the native format data, etc. Using PIDR 185, archive direct 184 may apply one or more threshold data rates (TDRs) 187 to dynamically and adaptively determine, for a time period, to either initially store and accumulate chunks 164 (derived from the stream(s)) to local repository 107 separate from local storage system 105 or directly archive chunks 164 to archive storage system 115 (however, archive direct 184 may temporarily store chunks 164 in local repository 107—e.g., random access memory—RAM).

In operation, archive direct 184 may predict an incoming data rate of native format data (e.g., received directly from application system 102—meaning without an intermediate data platform agent to forward chunks 164 themselves) to obtain PIDR 185. Archive direct 184 may utilize machine learning (ML) and/or artificial intelligence (AI, which is a subset of machine learning) to perform prediction with respect to incoming data rates to obtain PIDR 185. Archive direct 184 may apply an ML and/or AI (ML/AI) model to streams, aggregates of streams from one or more sources of a given tenant (but typically not across tenants due to privacy concerns), etc., based on past incoming data rates for the streams, aggregates of two or more streams from one or more sources of a given tenant, etc. to obtain PIDR 185.

Examples of ML/AI models may include neural networks, deep neural networks, dense neural networks, and the like. Although described with respect to ML/AI models, the techniques described in this disclosure are also applicable to other types of ML/AI models, including rule-based models, finite state machines, and the like. Furthermore, while PIDR 185 is discussed as being obtained via application of ML/AI models, other forms of prediction may occur to approximate PIDR 185 using, e.g., time-series analysis (TSA) and/or time-series forecasting (TSF).

In any event, machine learning may generally enable archive direct 184 to analyze input data and identify an action to be performed responsive to the input data. Each ML/AI model may be trained using training data that reflects likely input data (e.g., a time series of incoming data rates). The training data may be labeled or unlabeled (meaning that the correct action to be taken based on a sample of training data is explicitly stated or not explicitly stated, respectively).

The training of the ML/AI model may be guided (in that a designer, such as a computer programmer, may direct the training to guide the ML/AI model to identify the correct action in view of the input data) or unguided (in that the ML/AI model is not guided by a designer to identify the correct action in view of the input data). In some instances, the ML/AI model is trained through a combination of labeled and unlabeled training data, a combination of guided and unguided training, or possibly combinations thereof. Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Archive direct 184 may, responsive to determining that PIDR 185 exceeds (or possibly equals) a first TDR 187, segment the native format data into chunks 164. This first TDR 187 may define a threshold data rate above which it is preferable to perform direct archiving of chunks 164 to archive storage system 115. The threshold data rate may be expressed as a bandwidth, for example, one megabyte per second (1 MB/s), 2 MB/s, 0.5 MB/s. That is, an efficient (or in other words, target) archive chunkfile size may be 2 MB and assuming data will be accumulated in local repository 107 for up to 100 milliseconds (ms), TDR 187 may be 20 MB/s. In some instances, this threshold data rate may be adaptive, in which case archive direct 184 may adapt TDR 187 based on current load (e.g., amount of native format data being received, computing resources consumed by archive direct 184 or more generally by data platform 150, etc.). Furthermore, the threshold data rate may be different for different formats of native format data, where for example, there may be a first threshold data rate for images, a second threshold data rate for documents, etc. Moreover, an AI/ML model may be applied (similar to above) to determine TDR 187.

Archive direct 184 may, again responsive to determining that PIDR 185 exceeds the first TDR 187, directly write one or more chunks 164 to archive storage system 105 as a chunkfile 162. Again, directly writing chunks 164 may include temporarily storage of chunks 164 in local repository 107, e.g., a cache, RAM, or other very high-speed (meaning low-latency) memory (possibly Flash memory) separate from local storage system 105, for purposes of processing native format data into chunks 164. In this sense, directly writing chunks 164 may occur without accumulating (over time) chunks 164 in local storage system 105 to form optimally-sized chunkfiles 162, but rather may occur simply for the purposes of segmenting the incoming native format data into chunks 164. Local repository 107 may represent memory or other low-latency storage used for processes executed by data platform 150 that stores data temporarily and is separate from local storage system 105 used for accumulating chunks 164 to form optimally-sized chunkfiles for low data rate streams and/or store at least a portion of a local copy of the filesystem. Local repository 107 may in other words represent a low latency memory (e.g., RAM and/or flash memory) that, while limited in total storage capacity compared to storage system 105, provides lower latency compared to storage system 105.

Archive direct 184 may, responsive to determining that PIDR 185 is below (or possibly equals) first TDR 187, segment the native format data into chunks 164, and write chunks 164 to local storage system 105 of data platform 150. PIDR 185 below (or equal) to first TDR 187 may indicate that an expected incoming data rate (which is another way of referring to PIDR 185) is insufficient to formulate optimal sized chunkfiles 162 during direct archiving of chunks 164, archive direct 184 may effectively buffer chunks 164 of native format data locally to a solid-state drive and/or a hard disk drive of local storage system 105. In some examples, archive direct 184 may select between a solid-state drive (SSD) and/or a hard disk drive (HDD) of local storage system 105 to buffer chunks 164 based on a percentage below first TDR 187, where lower percentages (e.g., within 10-20% of TDR 187) cause archive direct 184 to store to the SSD, while higher percentages (e.g., 20% or above of TDR 187) cause archive direct 184 to store to the HDD. In any event, responsive to determining that chunks 164 written to local storage system 105 exceed a threshold data amount (TDA) 189 ("TDA 189"), which may be approximately 8 or 16 MB, for forming a chunkfile 162, archive direct 184 may write chunks 164 to archive storage system 115 as a chunkfile 162. TDA 189 in this way defines a preferred size for chunksfiles 162 for data platform 150.

In this way, the techniques may provide one or more technical advantages that realize a practical application. For example, the techniques may reduce computing resource consumption at local storage system 105 and archive storage system 115 by adaptively determining, for a given duration of time, where streams of native format data should be stored prior to archiving resulting chunks 164. Archive direct 184 may implement the techniques to more efficiently archive chunks 164 when PIDR 185 indicates that large amounts of native format data is to be received in amounts above the threshold data rate (in a given duration, or in other words amount of time), thereby more quickly archiving chunks 164 into potentially optimally sized chunkfiles 162. Archive direct 184 may, when PIDR 185 indicates that native format data is to be received in amounts below the threshold data rate (in the given duration), store chunks 164 to local storage system 105. As a result, data platform 150 may reduce consumption of memory, memory bandwidth, and/or other computing resources at local storage system 105, reduce disk writes and reads at local storage system 105, reduce metadata and garbage collection loads, and reduce delay in archiving chunks 164, while also potentially storing optimal sized chunkfiles 162 that reduce consumption of computing resources at archive storage system 115 (and associated monetary costs) by, e.g., reducing metadata bloat due to a larger number of smaller-sized chunkfiles 162.

In some instances, PIDR 185 may not reflect actual incoming data rates in that streaming of native format data may abruptly change for a number of different reasons, such as network bandwidth constraints, network latency, network load, local load changes for data platform 150 (in terms of computing resources, number of streams received), unexpected errors, etc. While archive direct 184 may still attempt direct archiving of chunks 164 when PIDR 185 exceeds TDR 187 in this instance, archive direct 184 may create sub-optimally sized chunkfiles 162, but still reduce delay in archiving chunks 164 as chunkfiles 162, or fallback to storing the data to local repository 107. This delay is reduced because archive direct 184 may only delay direct archiving of chunks 164 for a limited amount of time (e.g., 100 milliseconds—ms), which may be significantly faster than when archive direct 184 initially stores and accumulates chunks 164 to local storage system 105 (which may occur over several seconds or minutes if not longer). Likewise, when PIDR 185 is below TDR 187 when the actual incoming data rate exceeds TDR 187, archive direct 184 may still buffer chunks 164 in the expected manner to local storage system 105, but formulate optimal-sized chunkfiles 162 more rapidly. In other words, archive direct 185 may achieve the foregoing benefits as a percentage of how accurate PIDR 185 is to the actual incoming data rate.

System 190 of FIG. 1B is a variation of system 100 of FIG. 1A in that data platform 150 stores archives 142 using chunkfiles 162 stored to archive storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by archive manager 154 for initially storing and accumulating chunks prior to archive to storage system 115.

Figure 2:
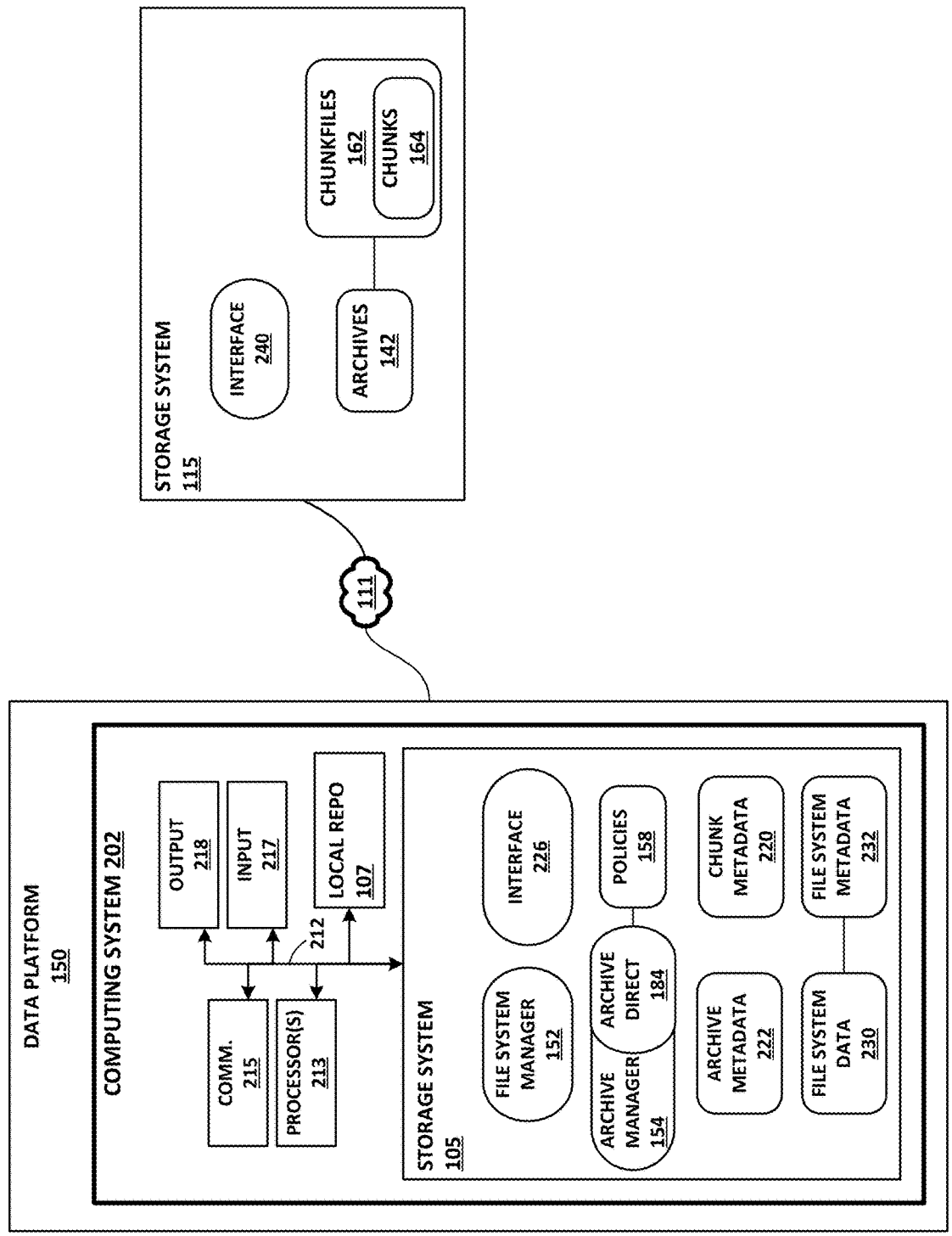
FIG. 2 is a block diagram illustrating example system 200, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where chunkfiles 162 are written to a local archive storage system 115). One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one archive storage system 115 is depicted, data platform 150 may apply techniques in accordance with this disclosure using multiple instances of archive storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 includes interface module 226, file system manager 152, archive manager 154, policies 158, archive metadata 222, and chunk metadata 220. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more trees that describe objects within file system 153 and the file system 153 hierarchy, and can be used to write or retrieve objects within file system 153. File system metadata 232 may reference any of chunk metadata 220 or archive metadata 222, and vice-versa. File system manager 152 may interact with and/or operate in conjunction with one or more modules of computing system 202, including interface module 226 and archive manager 154.

Archive manager 154 may perform archive functions relating to archiving file system 153, as described above with respect to FIG. 1A, including operations described above with respect to archive direct 184. Archive manager 154 may generate one or more archives 142 and cause file system data 230 to be stored as chunks 164 within chunkfiles 162 in archive storage system 115. Archive manager 154 may apply an adaptive deduplication process to selectively deduplicate chunks of objects within file system data 230, in accordance with one or more policies 158. Archive manager 154 may generate and manage archive metadata 222 for generating, viewing, retrieving, or restoring any of archives 142. Archive metadata 222 may include respective original data lock periods for archives 142. Archive manager 154 may generate and manage chunk metadata 220 for generating, viewing, retrieving, or restoring objects stored as chunks 164 (and references thereto) within chunkfiles 162, for any of archives 142. Stored objects may be represented and manipulated using logical files for identifying chunks for the objects. Chunk metadata 220 may include a chunk table that describes chunks 164. The chunk table may include respective chunk IDs for chunks 164 and may contain pointers to chunkfiles 162 and offsets within chunkfiles 162 for retrieving chunks 164 from storage system 115. Chunks 164 are written into chunkfiles 162 at different offsets. By comparing new chunk IDs to the chunk table, archive manager 154 can determine if the data already exists on the system. If the chunks already exist, data can be discarded and metadata for an object may be updated to reference the existing chunk. Archive manager 154 may use the chunk table to look up the chunkfile identifier for the chunkfile that contains a chunk.

Chunk metadata 220 may include a chunkfile table that describes respective physical or virtual locations of chunkfiles 162 on storage system 115, along with other metadata about the chunkfile, such as a checksum, encryption data, compression data, etc. In FIG. 2, archive manager 152 causes archive metadata 222 and chunk metadata 220 to be stored to local storage system 105. In some examples, archive manager 152 causes some or all of archive metadata 222 and chunk metadata 220 to be stored to archive storage system 115. Archive manager 152, optionally in conjunction with file system manager 152, may use archive metadata 222, chunk metadata 220, and/or file system metadata 232 to restore any of archives 142 to a file system implemented by data platform 150, which may be presented by file system manager 152 to other systems.

Interface module 226 may execute an interface by which other systems or devices may determine operations of file system manager 152 or archive manager 154. Another system or device may communicate via an interface of interface module 226 to specify one or more policies 158.

System 200 may be modified to implement an example of system 190 of FIG. 1B. In the modified system 200, chunkfiles 162 are stored to a local archive storage system 115 to support archives 142.

Interface module 240 of archive storage system 115 may execute an interface by which other systems or devices may create, modify, delete, or extend a WORM lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 162).

Figure 3A:
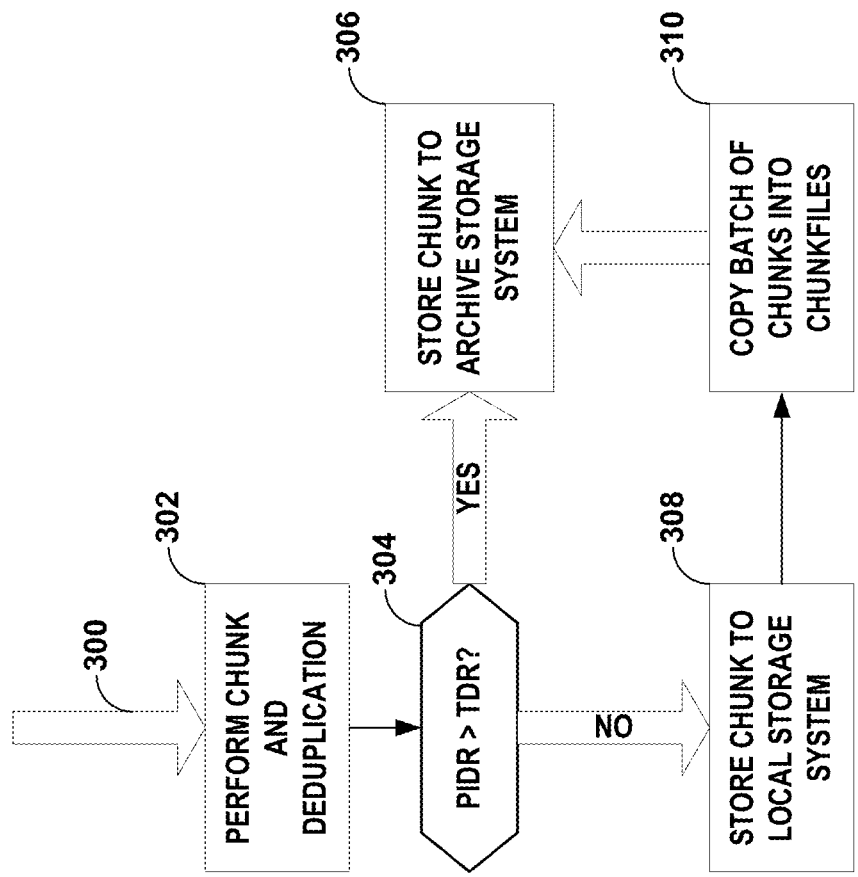
FIGS. 3A-3C are diagrams illustrating example modes of operation for a data platform to perform adaptive direct archiving for chunkfiles created from one or more streams.
Figure 3B:
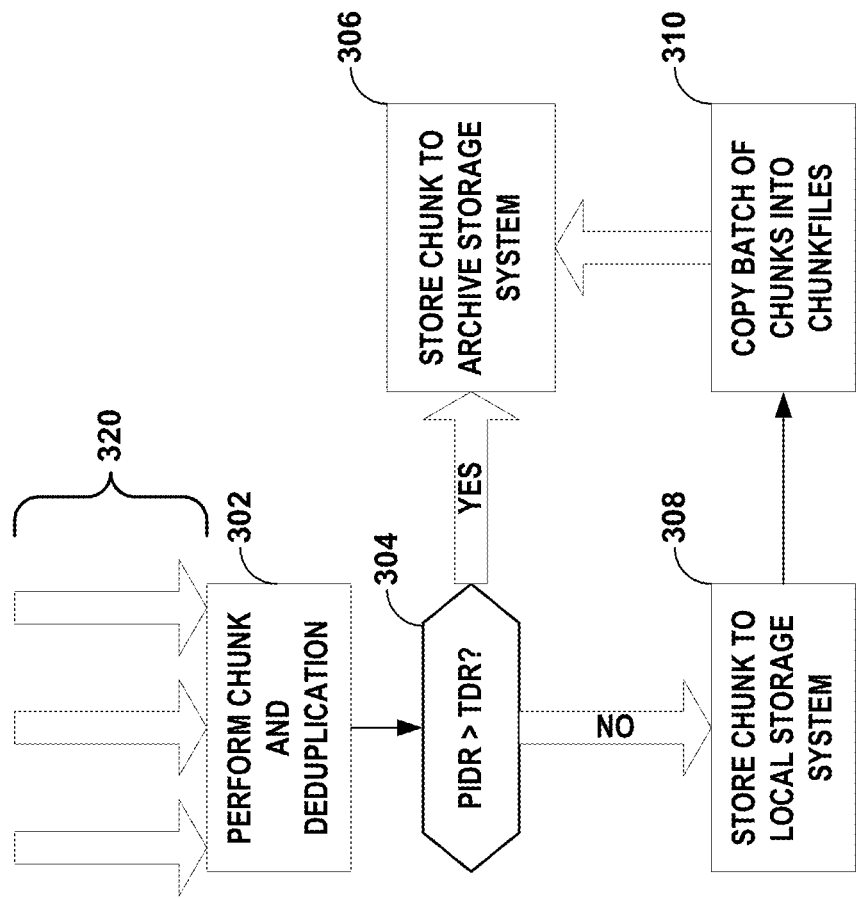
Figure 3C:
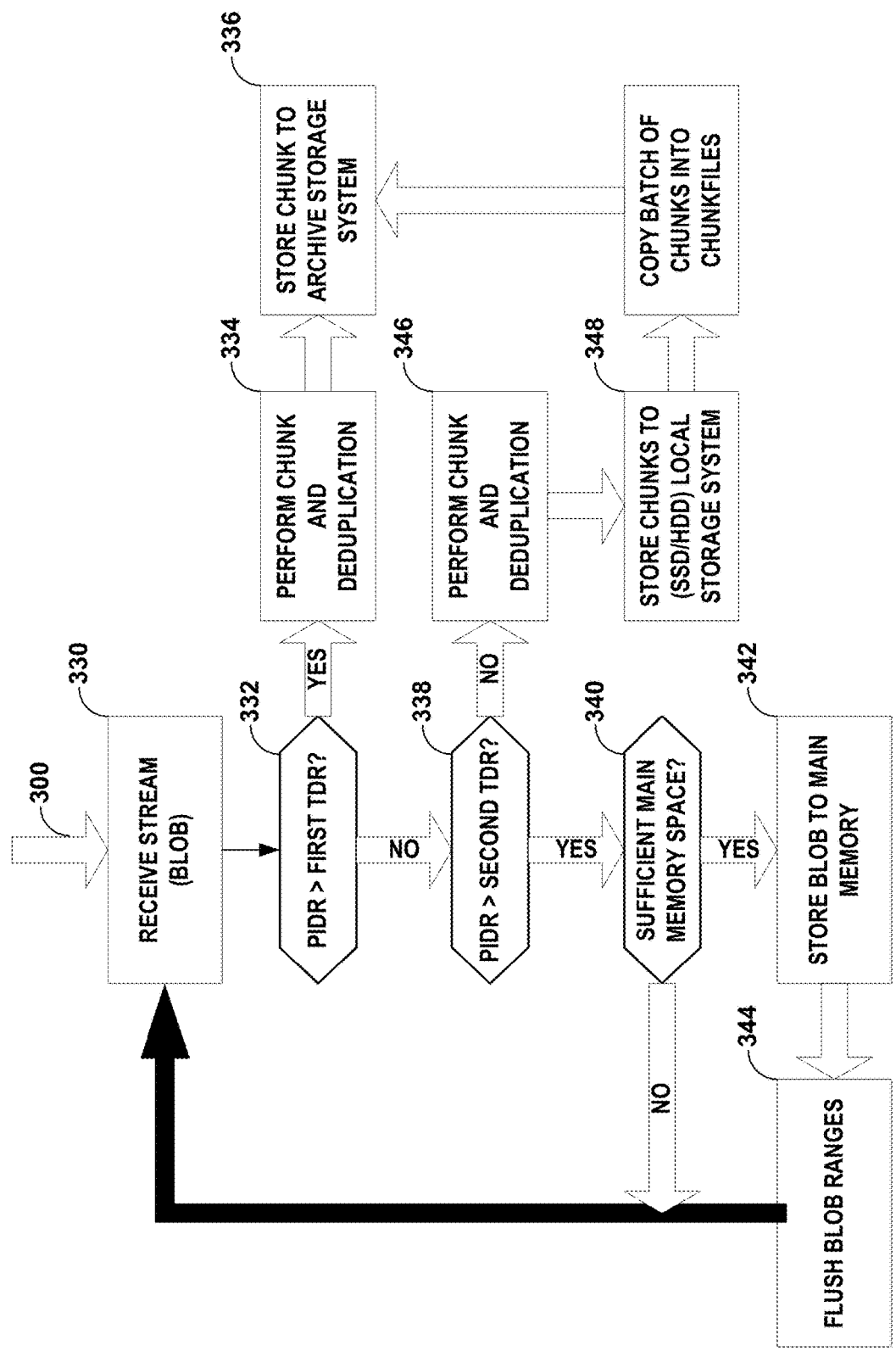

FIGS. 3A-3C are diagrams illustrating example modes of operation for a data platform to perform adaptive direct archiving for chunkfiles created from one or more streams. Referring first to FIG. 3A, archive direct 184 may predict an incoming data rate of native format data (e.g., received directly from application system 102—meaning without an intermediate data platform agent to forward chunks 164 themselves) to obtain PIDR 185. As noted above, archive direct 184 may utilize machine learning (ML) and/or artificial intelligence (AI, which is a subset of machine learning) to perform prediction with respect to incoming data rates to obtain PIDR 185. Archive direct 184 may apply an ML and/or AI (ML/AI) model to streams, aggregates of streams from one or more sources for a given tenant (but typically not across tenants due to privacy concerns), etc. based on past incoming data rates for the streams, aggregates of two or more streams from a given source, etc. to obtain PIDR 185.

Archive direct 184 may receive a stream 300 and perform chunk and deduplication with respect to stream 300 (302), where stream 300 may also be referred to as a data stream 300. Archive direct 184 may maintain a table or other data structure for each stream 300, which may store a stream identifier (ID) along with a corresponding PIDR 185. Archive direct 184 may identify stream 300 (e.g., via an Internet protocol—IP-address; a packet flow five-tuple—which may include a source IP address, a destination IP address, a source port, a destination port, and a transport protocol; an application ID; or any other uniquely identifying information associated with stream 300) to obtain a stream ID. Archive direct 184 may access the table using the stream ID to identify an entry in the table that specifies PIDR 185 for stream 300.

Archive direct 184 may compare PIDR 185 to TDR 187 (304), where archive direct 184 may select an appropriate TDR 187 based on transport protocol, native file format, or other metadata associated with stream 300. Responsive to determining that PIDR 185 exceeds (or possibly equals) a first TDR 187 ("YES" 304), archive direct 184 may directly store chunks 164 to archive storage system 115 as a chunkfile 162 (306). Again, directly storing chunks 164 to archive storage system 115 may include temporarily storing chunks 164 in local repository 107, e.g., a cache, RAM, or other very high-speed (meaning low-latency) memory (e.g., possibly Flash memory) separate from local storage system 105, for purposes of processing native format data into chunks 164. These chunks 164 are not accumulated, but rather formed and directly stored to archive storage system 115, forming chunkfiles 162 prior to determining a batch of optimally-sized chunks 164.

Archive direct 184 may, responsive to determining that PIDR 185 is below (or possibly equals) first TDR 187 ("NO" 304), write chunks 164 to local storage system 105 of data platform 150 (308). PIDR 185 below (or equal) to first TDR 187 may indicate that an expected incoming data rate (which is another way of referring to PIDR 185) is insufficient to formulate optimal sized chunkfiles 162, archive direct 184 may effectively buffer chunks 164 of native format data locally to a solid-state drive and/or a hard disk drive (which are examples of a second tier of storage compared to a first tier of storage that may include RAM, Flash memory, or other low latency forms of memory compared to the second tier of storage) of local storage system 105. In some examples, archive direct 184 may select between a solid-state drive (SSD) and/or a hard disk drive (HDD) of local storage system 105 to buffer chunks 164 based on a percentage below first TDR 187, where lower percentages (e.g., within 10-20% of TDR 187) are stored to the SSD, while higher percentages (e.g., 20% or above of TDR 187) are stored to the HDD. In any event, responsive to determining that a batch of chunks written to local storage system 105 exceed a threshold data amount (TDA) 189, which may be approximately 8 MB or 16 MB, for forming a chunkfile, archive direct 184 may write the batch of chunks to archive storage system 115 as one of chunkfiles 162, or in other words, copy the batch of chunks into one of chunkfiles 162 within archive storage system 115 (310). Writing the batch of chunks from local storage system 105 to archive storage system 115 involves reading the batch of chunks from local storage system 105.

Referring next to the example of FIG. 3B, archive direct 184 may operate similar to the operations discussed above with respect to the example of FIG. 3A. However, rather than process an individual stream 300, archive direct 184 may process a number of different streams from one or more sources of the same tenant. Archive direct 184 may process aggregate streams 320 in the same manner as described above with respect to the example of FIG. 3A (302-310).

In the example of FIG. 3C, archive direct 184 may layer multiple different storage processes together in a more nuanced (or granular) archive storage architecture. Archive direct 184 may receive a stream 300, which may also be referred to as a blob 300 as a size of the native format data provided via stream 300 is unknown (330). It should be understood that archive direct 184 may apply the more granular archive storage scheme to multiple streams from one or more sources of the same tenant similar to the example of FIG. 3B.

Rather than chunk and deduplicate blob 300 as shown in the examples of FIGS. 3A and 3B, archive direct 184 may first obtain PIDR 185 and compare PIDR 185 to a first TDR 187 (332). First TDR 187 may be greater than a second TDR 187. In any event, archive direct 184 may, responsive to determining that PIDR 185 is greater (or equal) to first TDR 187 ("YES" 332), perform chunk and deduplication to obtain chunks 164 before directly storing chunks 164 to archive storage system 115 as chunkfile 162 (334, 336).

Responsive to determining that PIDR 185 is less than (or equal) to first TDR 187 ("NO" 332), archive direct 184 may obtain second TDR 187, and compare PIDR 185 to second TDR 187 (338). Archive direct 184 may, responsive to determining that PIDR 185 is greater than second TDR 187 ("YES" 338), determine whether there is sufficient main memory space (or in other words, storage amount) of local repository 107 to store blob 300 (in its native format, meaning without performing chunk and deduplication) (340).

Responsive to determining that there is sufficient main memory space in local repository 107 ("YES" 340), archive direct 184 may store blob 300 to RAM of local storage system 105 in an effort to buffer blob 300 in its normal format in low latency memory (342). This path of the archive storage architecture may be referred to as hydration (which may also be referred to as hydra) given that chunking and deduplication is not performed and thereby maintains hydration. Archive direct 184 may rehydrate blob ranges (e.g., when blob ranges meet chuck sizes or when main memory space (which is another way to refer to local repository 107) becomes limited in which case chunk sizes may not meet optimal sizes, which may, as an example, be 8 MB), flushing blob ranges back to active processing in the manner described above (344). Given that available main memory space may change rapidly, archive direct 184 may determine that there is insufficient main memory space ("NO" 340) and, responsive to determining that there is insufficient main memory space, return blob 300 to active processing in the manner described above.

In this respect, responsive to determining that PIDR 185 is below first TDR 187 and exceeds second TDR 187, archive direct 184 may write the native format data to main memory (RAM or Flash memory) of local repository 107 of data platform 150. Responsive to determining that a time limit (e.g., 100 ms) for writing the native format data to main memory of local repository 107 has been exceeded or that an amount of the native format data exceeds TDA 189, archive direct 184 may replay receipt of the native format data, segment the native format data into chunks 164, and write chunks 164 to archive storage system 115.

In any event, archive direct may, responsive to determining that PIDR 185 is greater than (or equal) to TDR 187, perform chunk and deduplication with respect to blob 300 to obtain chunks 184 (346). Archive direct 184 may next store chunks 164 to the SSD and/or HDD of local storage system 105 in the manner described above (348). Archive direct 184 may then copy a batch of chunks 164 to archive storage system 115 as a chunkfile 162 (350), effectively storing chunk 164 to archive storage system (336).

Figure 4:
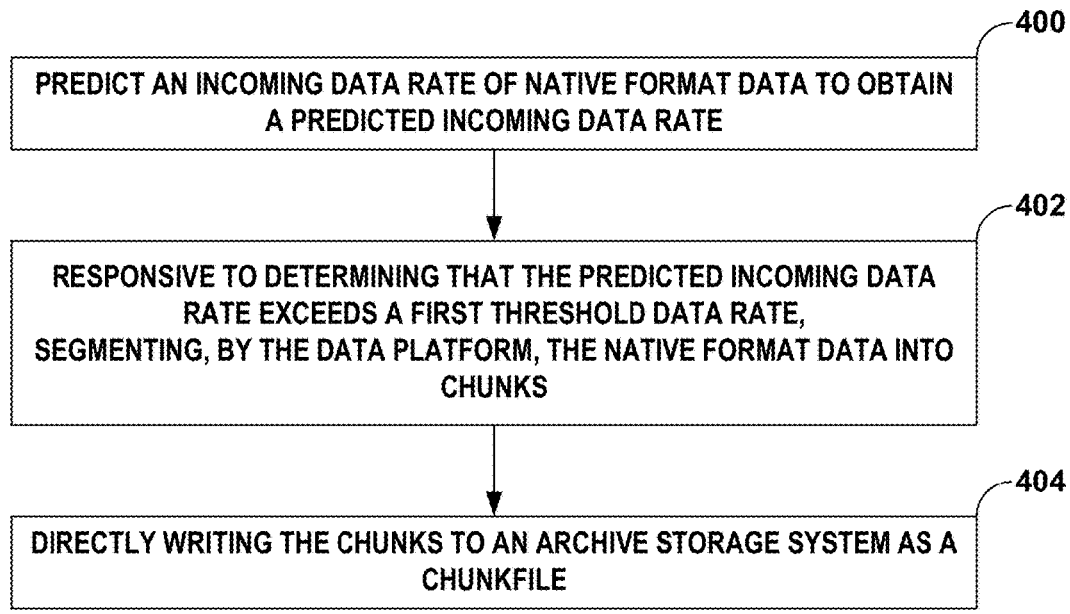
FIG. 4 is a flowchart illustrating example operation of the data platform in performing adaptive direct archive of chunkfiles in accordance with various aspects of the techniques described in this disclosure.

FIG. 4 is a flowchart illustrating example operation of the data platform in performing adaptive direct archive of chunkfiles in accordance with various aspects of the techniques described in this disclosure. As shown in the example of FIG. 4, archive direct 184 may predict an incoming data rate of native format data to obtain PIDR 185 (400). Archive direct 184 may, responsive to determining that PIDR 185 exceeds (or possibly equals) a first TDR 187, segment the native format data into chunks 164 (402). Archive direct 184 may, again responsive to determining that PIDR 185 exceeds the first TDR 187, directly write one or more chunks 164 to archive storage system 105 as a chunkfile 162 (404).

Although the techniques described in this disclosure are primarily described with respect to an archive function performed by an archive manager of a data platform, similar techniques may additionally or alternatively be applied for a backup, replica, clone, or snapshot functions performed by the data platform. In such cases, archives 142 would be backups, replicas, clones, or snapshots, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

As such, various aspects of the techniques may enable the following examples:

Example 1. A method comprising: predicting, by a data platform implemented by a computing system, an incoming data rate of native format data to be archived; comparing the predicted incoming data rate to a first threshold data rate; and responsive to determining that the predicted incoming data rate exceeds the first threshold data rate: segmenting, by the data platform, the native format data into chunks; and directly writing the chunks to an archive storage system as a chunkfile.

Example 2. The method of example 1, further comprising: responsive to determining that the predicted incoming data rate is below the first threshold data rate and exceeds a second threshold data rate, writing the native format data to a local repository of the data platform; responsive to determining that a time limit for writing the native format data to the local repository has been exceeded or that an amount of the native format data exceeds a threshold data amount: replaying receipt of the native format data; segmenting the native format data into the chunks; and writing the chunks to the archive storage system.

Example 3. The method of example 2, wherein writing the native format data to the local repository comprises writing the native format data to one or more of a random access memory or a flash memory of the local repository.

Example 4. The method of any combination of examples 1-3, further comprising: responsive to determining that the predicted incoming data rate is below the first threshold data rate: segmenting the native format data into the chunks; and writing the chunks to a local storage system of the data platform.

Example 5. The method of example 4, wherein writing the chunks to the local storage system of the data platform comprises writing the chunks to one or more of a solid state drive and a hard disk drive of the local storage system.

Example 6. The method of example 4, further comprising, responsive to determining that the chunks written to the local storage system exceed a threshold data amount for forming a chunkfile, writing the chunks to the archive storage system as a chunkfile.

Example 7. The method of any combination of examples 1-6, wherein predicting the incoming data rate of native format data comprises applying one or more of machine learning models and artificial intelligence models with respect to the native format data in order to obtain the predicted incoming data rate.

Example 8. The method of any combination of examples 1-7, wherein directly writing the chunks to the archive storage system as the chunkfile comprises writing the chunks to the archive storage system as the chunkfile without accumulating the chunks and writing the chunks to a local storage system of the data platform other than to a local repository separate from a local storage system for a threshold time limit.

Example 9. The method of any combination of examples 1-8, wherein segmenting the native format data into the chunks comprises segmenting the native format data into the chunks regardless of whether a size of the native format data exceeds a minimum chunkfile size.

Example 10. The method of any combination of examples 1-9, wherein the first threshold data rate comprises one or more threshold data rates that vary depending on a source or format of the native format data.

Example 11. The method of any combination of examples 1-10, wherein a source of the native format data does not permit installation of an agent to manage transmission of the native format data to the data platform.

Example 12. The method of any combination of examples 1-11, further comprising receiving the native format data as a data stream from a source.

Example 13. The method of any combination of examples 1-12, wherein the archive storage system resides in and is supported by cloud computing infrastructure or resides on premises with the data platform.

Example 14. A computing system comprising: a storage device; and processing circuitry having access to the storage device and configured to: predict an incoming data rate of native format to be archived to obtain a predicted incoming data rate for the native format data to be archived; compare the predicted incoming data rate to a first threshold data rate; and responsive to determining that the predicted incoming data rate exceeds a first threshold data rate: segment the native format data into chunks; and directly write the chunks to an archive storage system as a chunkfile.

Example 15. The computing system of example 14, wherein the processing circuitry is further configured to: responsive to determining that the predicted incoming data rate is below the first threshold data rate and exceeds a second threshold data rate, write the native format data to a local repository of the data platform; responsive to determining that a time limit for writing the native format data to the local repository has been exceeded or that an amount of the native format data exceeds a threshold data amount:

replay receipt of the native format data; segment the native format data into the chunks; and write the chunks to the archive storage system.

Example 16. The computing system of example 15, wherein the processing circuitry is configured to write the native format data to one or more of a random access memory or a flash memory of the local repository.

Example 17. The computing system of any combination of examples 14-16, wherein the processing circuitry is further configured to: responsive to determining that the predicted incoming data rate is below the first threshold data rate: segment the native format data into the chunks; and write the chunks to a local storage system of the data platform.

Example 18. The computing system of example 17, wherein the processing circuitry is configured to write the chunks to one or more of a solid state drive and a hard disk drive of the local storage system.

Example 19. The method of example 17, wherein the processing circuitry is further configured to, responsive to determining that the chunks written to the local storage system exceed a threshold data amount for forming a chunkfile, write the chunks to the archive storage system as a chunkfile.

Example 20. A computer-readable storage medium comprising instructions that, when executed, configure processing circuitry of a computing system to: predict an incoming data rate of native format to be archived to obtain a predicted incoming data rate for the native format data to be archived; compare the predicted incoming data rate to a first threshold data rate; and responsive to determining that the predicted incoming data rate exceeds a first threshold data rate: segment the native format data into chunks; and directly write the chunks to an archive storage system as a chunkfile.

The invention claimed is:

1. A method of adaptive data archive comprising:
    receiving from an application system, by a data platform implemented by a computing system, a stream of native format data;
    predicting, by the data platform, an incoming data rate of the stream of native format data to be archived by the data platform to produce a predicted incoming data rate;
    responsive to determining the predicted incoming data rate satisfies a first threshold data rate:
        segmenting the stream of native format data into one or more chunks;
        causing an archive storage system to store the one or more chunks within one or more chunkfiles; and
    responsive to determining the predicted incoming data rate satisfies a second threshold data rate after determining the predicted incoming data rate fails to satisfy the first threshold data rate and a time limit for writing the native format data to a local repository has been exceeded:
        replaying receipt of the stream of the native format data;
        segmenting the stream of native format data into one or more chunks;
        writing the one or more chunks to a local repository of the data platform, wherein writing the native format data to the local repository comprises writing the native format data to one of a random access memory or a flash memory of the local repository;
        generating the one or more chunkfiles with that includes a copy of the one or more chunks; and
        writing the one or more chunkfiles to cause the archive storage system to store the one or more chunkfiles.

2. The method of claim 1, wherein writing the one or more chunks to the local repository of the data platform comprises writing the chunks to one of a solid-state drive or a hard disk drive of a local storage system.

3. The method of claim 2, further comprising:
    determining a difference between the incoming data rate and the second threshold data rate; and
    selecting one of the solid-state drive or the hard disk drive of the local storage system based on the difference.

4. The method of claim 1, further comprising, responsive to determining that the chunks written to the local repository exceed a threshold data amount for forming the one or more chunkfiles, writing the chunks to the archive storage system as the one or more chunkfiles.

5. The method of claim 1, wherein predicting the incoming data rate of the stream of native format data comprises applying one or more machine learning models with respect to the native format data to obtain the predicted incoming data rate.

6. The method of claim 1, causing an archive storage system to store the one or more chunks within the one or more chunkfiles comprises storing the chunks to the archive storage system as the one or more chunkfiles without accumulating the chunks and writing the chunks to the local repository of the data platform other than to a local repository separate from a local storage system for a threshold time limit.

7. The method of claim 1, wherein segmenting the native format data into the chunks comprises segmenting the native format data into the chunks regardless of whether a size of the native format data exceeds a minimum chunkfile size.

8. The method of claim 1, wherein the first threshold data rate comprises one or more threshold data rates that vary depending on a source or format of the native format data.

9. The method of claim 1, wherein a source of the native format data does not permit installation of an agent to manage transmission of the native format data to the data platform.

10. The method of claim 1, wherein the archive storage system resides in and is supported by cloud computing infrastructure or resides on premises with the data platform.

11. A data archive system comprising:
    a storage device comprising computer-executable instructions; and
    processing circuitry configured to execute the computer-executable instructions that cause the data archive system to:
        receive, from an application system, by a data platform implemented by a computing system, a stream of native format data;
        predict, by the data platform, an incoming data rate of the stream of native format data to be archived to obtain a predicted incoming data rate for the stream of native format data to be archived-by a data platform;
        responsive to determining the predicted incoming data rate satisfies a first threshold data rate:
            segment the stream of native data format into chunks; and
            cause an archive storage system to store the chunks within one or more chunkfiles; and
        responsive to determining the predicted incoming data rate satisfies a second threshold data rate after determining the predicted incoming data rate fails to satisfy the first threshold data rate and a time limit for writing the native format data has been exceeded:
replay receipt of the stream of native format data;
segment the stream of native format data into chunks;
write the chunks to a local repository of a data platform, wherein the local repository comprises one of a random access memory or flash memory;
generate the one or more chunkfiles from the chunks; and
write the one or more chunkfiles to cause the archive storage system to store the one or more chunkfiles.

12. The data archive system of claim 11, wherein the computer-executable instructions cause the data archive system to write the chunks to one of a solid-state drive or a hard disk drive of a local storage system.

13. The data archive system of claim 11, wherein the computer-executable instructions cause the data archive system to, responsive to determining that the chunks written to the local repository exceed a threshold data amount for forming a chunkfile, write the chunks to the archive storage system as a chunkfile.

14. The data archive system of claim 12, wherein the computer-executable instructions further cause the data archive system to:
determine a difference between the incoming data rate and the second threshold data rate; and
select one of the solid-state drive or the hard disk drive of the local storage system based on the difference.

15. A non-transitory computer-readable storage media having instructions stored thereon that, when executed by processing circuitry, cause the processing circuitry to:
receive, from an application system, by a data platform implementing a computing system, a stream of native format data;
predict, by the data platform, an incoming data rate of the stream of native format data to be archived to obtain a predicted incoming data rate for the stream of native format data to be archived by a data platform;
responsive to determining the predicted incoming data rate satisfies a first threshold data rate:
segment the stream of native data format into chunks; and
cause an archive storage system to store the chunks within one or more chunkfiles; and
responsive to determining the predicted incoming data rate satisfies a second threshold data rate after determining the predicted incoming data rate fails to satisfy the first threshold data rate, and a time limit for writing the native format data to a local repository has been exceeded:
replay receipt of the stream of the native format data;
segment the stream of native format data into chunks;
write the chunks to a local repository of the data platform, wherein the local repository comprises one of a random access memory or flash memory;
generate the one or more chunkfiles from the chunks; and
writing the one or more chunkfiles to cause the archive storage system to store the one or more chunkfiles.

* * * * *